United States Patent
Lee et al.

(10) Patent No.: US 9,578,486 B2
(45) Date of Patent: Feb. 21, 2017

(54) METHOD AND APPARATUS FOR TRANSMITTING MOBILITY RELATED INFORMATION

(71) Applicant: LG ELECTRONICS INC., Seoul (KR)

(72) Inventors: Youngdae Lee, Seoul (KR); Sungjun Park, Seoul (KR); Seungjune Yi, Seoul (KR); Sunghoon Jung, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 39 days.

(21) Appl. No.: 14/412,326

(22) PCT Filed: Jul. 11, 2013

(86) PCT No.: PCT/KR2013/006219
§ 371 (c)(1),
(2) Date: Dec. 31, 2014

(87) PCT Pub. No.: WO2014/010972
PCT Pub. Date: Jan. 16, 2014

(65) Prior Publication Data
US 2015/0189493 A1    Jul. 2, 2015

Related U.S. Application Data

(60) Provisional application No. 61/671,065, filed on Jul. 12, 2012.

(51) Int. Cl.
H04W 8/08    (2009.01)
H04W 76/02   (2009.01)
H04W 76/04   (2009.01)

(52) U.S. Cl.
CPC ............. *H04W 8/082* (2013.01); *H04W 76/02* (2013.01); *H04W 76/021* (2013.01); *H04W 76/046* (2013.01); *H04W 76/04* (2013.01)

(58) Field of Classification Search
CPC .. H04W 76/02; H04W 76/046; H04W 76/021; H04W 8/082
See application file for complete search history.

(56) References Cited

U.S. PATENT DOCUMENTS

2011/0143808 A1    6/2011   Krco et al.
2011/0250880 A1*  10/2011   Olsson ................ H04W 76/027
                                                            455/423

(Continued)

FOREIGN PATENT DOCUMENTS

WO    2009141001    11/2009

OTHER PUBLICATIONS

Catt, "Analysis of UE Assistance Information for eDDA", R2-122159, 3GPP TSG RAN WG2 Meeting #78, May 2012, 6 pages.

(Continued)

*Primary Examiner* — Anez Ebrahim
(74) *Attorney, Agent, or Firm* — Lee Hong Degerman Kang Waimey

(57) ABSTRACT

A method and apparatus for transmitting mobility-related information in a wireless communication system is provided. A user equipment (UE) receives a configuration for transmission of mobility-related information from a network during connection establishment, and transmits the mobility-related information to the network based on the configuration of the transmission of the mobility-related information.

8 Claims, 13 Drawing Sheets

(56) References Cited

U.S. PATENT DOCUMENTS

2011/0305215 A1    12/2011  Hofmann et al.
2013/0079017 A1*    3/2013  Mach ................ H04W 36/0083
                                              455/441
2015/0030001 A1*    1/2015  Koskinen ................ H04W 8/08
                                              370/331

OTHER PUBLICATIONS

China Unicorn, "Discussion on UE assistant information", R2-122437, 3GPP TSG-RAN WG2 Meeting #78, May 2012, 5 pages.
Nokia Corporation, Nokia Siemens Networks, "UE assistance for mobility", R2-122516, 3GPP TSG-RAN WG2 Meeting #78, May 2012, 5 pages.
PCT International Application No. PCT/KR2013006219, Written Opinion of the International Searching Authority dated Oct. 25, 2015, 1 page.
European Patent Office Application Serial No. 13817574.0, Search Report dated Mar. 1, 2016, 8 pages.
Renesas Mobile Europe Ltd., "Summary of email discussion [77#33] LTE: Mobility State Estimation Enhancements", R2-121850, 3GPP TSG-RAN WG2 #77bis, Mar. 2012, 24 pages.

* cited by examiner

METHOD AND APPARATUS FOR TRANSMITTING MOBILITY RELATED INFORMATION

CROSS-REFERENCE TO RELATED APPLICATIONS

This application is the National Stage filing under 35 U.S.C. 371 of International Application No. PCT/KR2013/006219, filed on Jul. 11, 2013, which claims the benefit of U.S. Provisional Application Ser. No. 61/671,065, filed on Jul. 12, 2012, the contents of which are hereby incorporated by reference herein in their entirety.

BACKGROUND OF THE INVENTION

Field of the Invention

The present invention relates to wireless communications, and more particularly, to a method and apparatus for transmitting mobility-related information in a wireless communication system.

Related Art

Universal mobile telecommunications system (UMTS) is a 3rd generation (3G) asynchronous mobile communication system operating in wideband code division multiple access (WCDMA) based on European systems, global system for mobile communications (GSM) and general packet radio services (GPRS). A long-term evolution (LTE) of UMTS is under discussion by the 3rd generation partnership project (3GPP) that standardized UMTS.

A radio resource state (RRC) state indicates whether an RRC of a user equipment (UE) is logically connected to an RRC of a network. When an RRC connection is established between an RRC layer of the UE and an RRC layer of the network, the UE is in an RRC connected state (RRC_CONNECTED), and otherwise the UE is in an RRC idle state (RRC_IDLE). Since the UE in the RRC_CONNECTED has the RRC connection established with the network, the network can recognize the existence of the UE in the RRC_CONNECTED and can effectively control the UE. Meanwhile, the UE in the RRC_IDLE cannot be recognized by the network, and a core network (CN) manages the UE in unit of a tracking area (TA) which is a larger area than a cell. That is, only the existence of the UE in the RRC_IDLE is recognized in unit of a large area, and the UE must transition to the RRC_CONNECTED to receive a typical mobile communication service such as voice or data communication.

When the user initially powers on the UE, the UE first searches for a proper cell and then remains in the RRC_IDLE in the cell. When there is a need to establish an RRC connection, the UE which remains in the RRC_IDLE may establish the RRC connection with the RRC of the network through an RRC connection procedure and then may transition to the RRC_CONNECTED. The UE which remains in the RRC_IDLE may need to establish the RRC connection with the network when uplink data transmission is necessary due to a user's call attempt or the like or when there is a need to transmit a response message upon receiving a paging message from the network.

Enhancements for diverse data applications (eDDA) may be introduced in 3GPP LTE. Goal of the eDDA is reducing control signaling overhead in protocol layers. The eDDA can improve both control signaling and power efficiency for UEs based on traffic pattern, and obtain low cost from network or core network point of view. Low cost is typically the target for machine-type communication traffic, background traffic, offline traffic of interactive application, etc.

A method for transmitting mobility-related information efficiently, when a UE transits from RRC_IDLE to RRC_CONNECTED, may be required.

SUMMARY OF THE INVENTION

The present invention provides a method and apparatus for transmitting mobility-related information in a wireless communication system. The present invention provides a method for transmitting mobility-related information during connection establishment based on a configuration for transmission of the mobility-related information. The present invention also provides a method for defining the configuration for transmission of the mobility-related information and/or an indication indicating whether the mobility-related information is supported.

In an aspect, a method for transmitting, by a user equipment (UE), mobility-related information in a wireless communication system is provided. The method includes constructing mobility-related information, receiving a configuration for transmission of the mobility-related information from a network during connection establishment, and transmitting the mobility-related information to the network based on the configuration of the transmission of the mobility-related information.

The mobility-related information may correspond to mobility assistance information.

The mobility-related information may indicate mobility state estimation or history information.

The mobility state estimation may indicate one of a normal-mobility state, a medium-mobility state and a high-mobility state.

The configuration may be received from the network via a radio resource control (RRC) connection setup message.

The configuration may be received from the network via an RRC connection reconfiguration message.

The method may further include transmitting an indication indicating whether the UE supports transmission of the mobility-related information to the network.

The indication may be transmitted via an RRC connection setup complete message.

The indication may be transmitted via a UE capability information message.

The mobility-related information may be transmitted via an RRC connection setup complete message.

The mobility-related information may be transmitted via an enhancements for diverse data applications (eDDA) indication.

In another aspect, a user equipment (UE) in a wireless communication system is provided. The UE includes a radio frequency (RF) unit for transmitting or receiving a radio signal, and a processor coupled to the RF unit, and configured for constructing mobility-related information, receiving a configuration for transmission of the mobility-related information from a network during connection establishment, and transmitting the mobility-related information to the network based on the configuration of the transmission of the mobility-related information.

Mobility-related information can be transmitted efficiently.

DESCRIPTION OF EXEMPLARY EMBODIMENTS

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA-2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi), IEEE 802.16 (WiMAX), IEEE 802.20, evolved UTRA (E-UTRA), etc. IEEE 802.16m is evolved from IEEE 802.16e, and provides backward compatibility with a system based on the IEEE 802.16e. The UTRA is a part of a universal mobile telecommunication system (UMTS). 3$^{rd}$ generation partnership project (3GPP) long term evolution (LTE) is a part of an evolved UMTS (E-UMTS) using the E-UTRA. The 3GPP LTE uses the OFDMA in a downlink and uses the SC-FDMA in an uplink. LTE-advanced (LTE-A) is an evolution of the LTE.

For clarity, the following description will focus on LTE-A. However, technical features of the present invention are not limited thereto.

Figure 1:
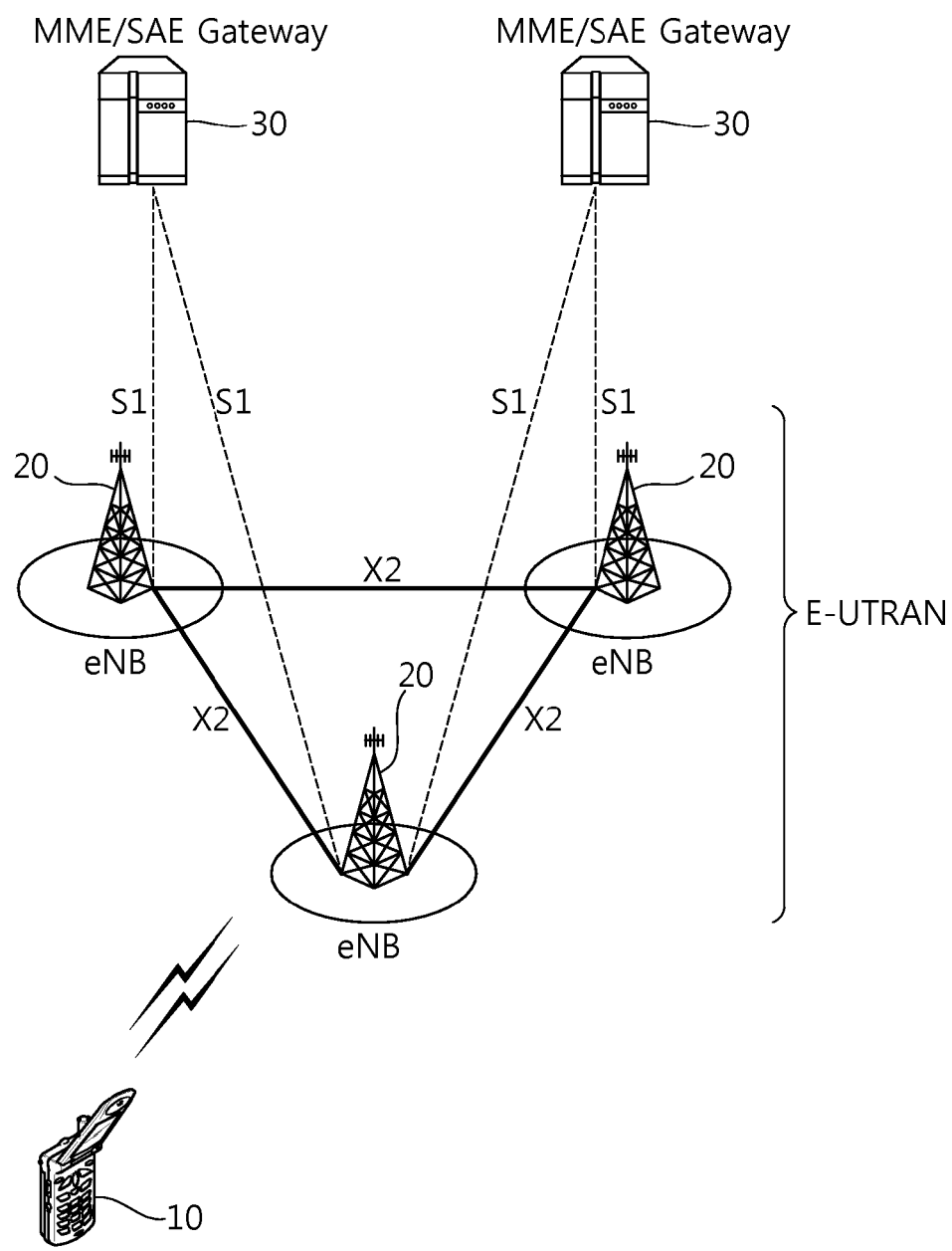
FIG. 1 shows a structure of a wireless communication system.

FIG. 1 shows a structure of a wireless communication system.

The structure of FIG. 1 is an example of a network structure of an evolved-UMTS terrestrial radio access network (E-UTRAN). An E-UTRAN system may be a 3GPP LTE/LTE-A system. An evolved-UMTS terrestrial radio access network (E-UTRAN) includes a user equipment (UE) 10 and a base station (BS) 20 which provides a control plane and a user plane to the UE. The user equipment (UE) 10 may be fixed or mobile, and may be referred to as another terminology, such as a mobile station (MS), a user terminal (UT), a subscriber station (SS), a wireless device, etc. The BS 20 is generally a fixed station that communicates with the UE 10 and may be referred to as another terminology, such as an evolved node-B (eNB), a base transceiver system (BTS), an access point, etc. There are one or more cells within the coverage of the BS 20. A single cell is configured to have one of bandwidths selected from 1.25, 2.5, 5, 10, and 20 MHz, etc., and provides downlink or uplink transmission services to several UEs. In this case, different cells can be configured to provide different bandwidths.

Interfaces for transmitting user traffic or control traffic may be used between the BSs 20. The BSs 20 are interconnected by means of an X2 interface. The BSs 20 are connected to an evolved packet core (EPC) by means of an S1 interface. The EPC may consist of a mobility management entity (MME) 30, a serving gateway (S-GW), and a packet data network (PDN) gateway (PDN-GW). The MME has UE access information or UE capability information, and such information may be primarily used in UE mobility management. The S-GW is a gateway of which an endpoint is an E-UTRAN. The PDN-GW is a gateway of which an endpoint is a PDN. The BSs 20 are connected to the MME 30 by means of an S1-MME, and are connected to the S-GW by means of S1-U. The S1 interface supports a many-to-many relation between the BS 20 and the MME/S-GW 30.

Hereinafter, a downlink (DL) denotes communication from the BS 20 to the UE 10, and an uplink (UL) denotes communication from the UE 10 to the BS 20. In the DL, a transmitter may be a part of the BS 20, and a receiver may be a part of the UE 10. In the UL, the transmitter may be a part of the UE 10, and the receiver may be a part of the BS 20.

Figure 2:
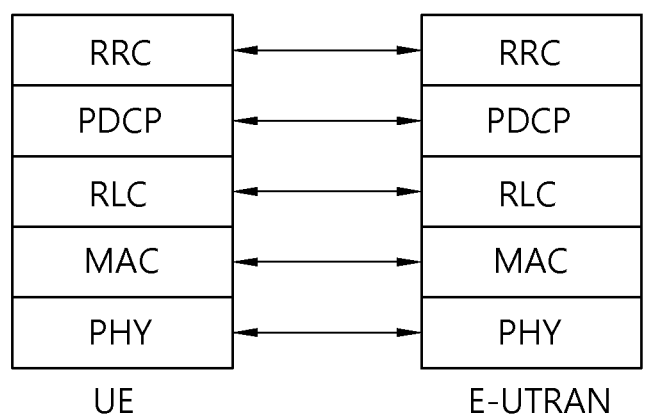
FIG. 2 is a diagram showing a radio interface protocol architecture for a control plane.
Figure 3:
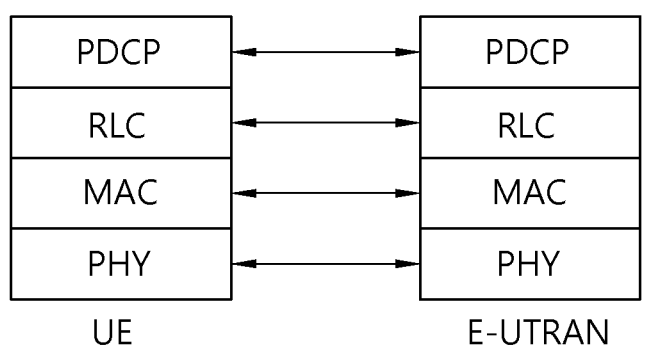
FIG. 3 is a diagram showing a radio interface protocol architecture for a user plane.

FIG. 2 is a diagram showing a radio interface protocol architecture for a control plane. FIG. 3 is a diagram showing a radio interface protocol architecture for a user plane.

Layers of a radio interface protocol between the UE and the E-UTRAN can be classified into a first layer (L1), a second layer (L2), and a third layer (L3) based on the lower three layers of the open system interconnection (OSI) model that is well-known in the communication system. The radio interface protocol between the UE and the E-UTRAN can be horizontally divided into a physical layer, a data link layer, and a network layer, and can be vertically divided into a control plane which is a protocol stack for control signal transmission and a user plane which is a protocol stack for data information transmission. The layers of the radio interface protocol exist in pairs at the UE and the E-UTRAN.

A physical (PHY) layer belonging to the L1 provides an upper layer with an information transfer service through a physical channel. The PHY layer is connected to a medium access control (MAC) layer which is an upper layer of the PHY layer through a transport channel. Data is transferred between the MAC layer and the PHY layer through the transport channel. The transport channel is classified according to how and with what characteristics data is transmitted through a radio interface. Between different PHY layers, i.e., a PHY layer of a transmitter and a PHY layer of a receiver, data is transferred through the physical channel. The physical channel is modulated using an orthogonal frequency division multiplexing (OFDM) scheme, and utilizes time and frequency as a radio resource.

The PHY layer uses several physical control channels. A physical downlink control channel (PDCCH) reports to a UE about resource allocation of a paging channel (PCH) and a downlink shared channel (DL-SCH), and hybrid automatic repeat request (HARQ) information related to the DL-SCH. The PDCCH can carry a UL grant for reporting to the UE about resource allocation of UL transmission. A physical control format indicator channel (PCFICH) reports the number of OFDM symbols used for PDCCHs to the UE, and is transmitted in every subframe. A physical hybrid ARQ indicator channel (PHICH) carries an HARQ ACK/NACK signal in response to UL transmission. A physical uplink control channel (PUCCH) carries UL control information such as HARQ ACK/NACK for DL transmission, scheduling request, and CQI. A physical uplink shared channel (PUSCH) carries a UL-uplink shared channel (SCH).

Figure 4:
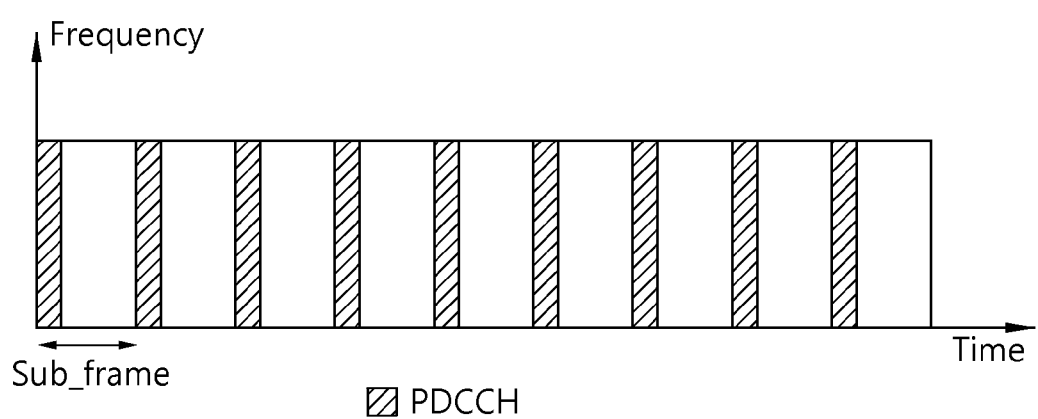
FIG. 4 shows an example of a physical channel structure.

FIG. 4 shows an example of a physical channel structure.

A physical channel consists of a plurality of subframes in a time domain and a plurality of subcarriers in a frequency domain. One subframe consists of a plurality of symbols in the time domain. One subframe consists of a plurality of resource blocks (RBs). One RB consists of a plurality of symbols and a plurality of subcarriers. In addition, each subframe can use specific subcarriers of specific symbols of a corresponding subframe for a PDCCH. For example, a first symbol of the subframe can be used for the PDCCH. A transmission time interval (TTI) which is a unit time for data transmission may be equal to a length of one subframe.

A DL transport channel for transmitting data from the network to the UE includes a broadcast channel (BCH) for transmitting system information, a paging channel (PCH) for transmitting a paging message, a DL-SCH for transmitting user traffic or control signals, etc. The system information carries one or more system information blocks. All system information blocks can be transmitted with the same periodicity. Traffic or control signals of a multimedia broadcast/multicast service (MBMS) are transmitted through a multicast channel (MCH). Meanwhile, a UL transport channel for transmitting data from the UE to the network includes a random access channel (RACH) for transmitting an initial control message, a UL-SCH for transmitting user traffic or control signals, etc.

A MAC layer belonging to the L2 provides a service to a higher layer, i.e., a radio link control (RLC), through a logical channel. A function of the MAC layer includes mapping between the logical channel and the transport channel and multiplexing/de-multiplexing for a transport block provided to a physical channel on a transport channel of a MAC service data unit (SDU) belonging to the logical channel. The logical channel is located above the transport channel, and is mapped to the transport channel. The logical channel can be divided into a control channel for delivering control region information and a traffic channel for delivering user region information. The logical includes a broadcast control channel (BCCH), a paging control channel (PCCH), a common control channel (CCCH), a multicast control channel (MCCH), a multicast traffic channel (MTCH), etc.

An RLC layer belonging to the L2 supports reliable data transmission. A function of the RLC layer includes RLC SDU concatenation, segmentation, and reassembly. To ensure a variety of quality of service (QoS) required by a radio bearer (RB), the RLC layer provides three operation modes, i.e., a transparent mode (TM), an unacknowledged mode (UM), and an acknowledged mode (AM). The AM RLC provides error correction by using an automatic repeat request (ARQ). Meanwhile, a function of the RLC layer can be implemented with a functional block inside the MAC layer. In this case, the RLC layer may not exist.

A packet data convergence protocol (PDCP) layer belongs to the L2. A function of a packet data convergence protocol (PDCP) layer in the user plane includes user data delivery, header compression, and ciphering. The header compression has a function for decreasing a size of an IP packet header which contains relatively large-sized and unnecessary control information, to support effective transmission in a radio section having a narrow bandwidth. A function of a PDCP layer in the control plane includes control-plane data delivery and ciphering/integrity protection.

A radio resource control (RRC) layer belonging to the L3 is defined only in the control plane. The RRC layer takes a role of controlling a radio resource between the UE and the network. For this, the UE and the network exchange an RRC message through the RRC layer. The RRC layer serves to control the logical channel, the transport channel, and the physical channel in association with configuration, reconfiguration, and release of RBs. An RB is a logical path provided by the L2 for data delivery between the UE and the network. The configuration of the RB implies a process for specifying a radio protocol layer and channel properties to provide a particular service and for determining respective detailed parameters and operations. The RB can be classified into two types, i.e., a signaling RB (SRB) and a data RB (DRB). The SRB is used as a path for transmitting an RRC message in the control plane. The DRB is used as a path for transmitting user data in the user plane.

A non-access stratum (NAS) layer belongs to an upper layer of the RRC layer and serves to perform session management, mobility management, or the like. To manage mobility of the UE in the NAS layer, two states, i.e., an EPS mobility management (EMM)-REGISTERED state and an EMM-DEREGISTERED state, can be defined. The two states are applicable to the UE and the MME. The UE is initially in the EMM-DEREGISTERED. To access the network, the UE may perform a process of registering to the network through an initial attach procedure. If the initial attach procedure is successfully performed, the UE and the MME may be in the EMM-REGISTERED.

In addition, to manage a signaling connection between the UE and the EPC, two states, i.e., an EPS connection management (ECM)-IDLE state and an ECM-CONNECTED state, can be defined. The two states are applicable to the UE and the MME. When the UE in the ECM-IDLE establishes an RRC connection with the E-UTRAN, the UE may be in the ECM-CONNECTED. When the MME in the ECM-IDLE establishes an S1 connection with the E-UTRAN, the MME may be in the ECM-CONNECTED. When the UE is in the ECM-IDLE, the E-UTRAN does not have information on the context of the UE. Therefore, the UE in the ECM-IDLE can perform a UE-based mobility related procedure such as cell selection or cell reselection without having to receive a command of the network. If a location of the UE in the ECM-IDLE becomes different from a location known to the network, the UE may report the location of the UE to the network through a tracking area update procedure. On the other hand, the mobility of the UE in the ECM-CONNECTED may be managed by the command of the network.

Figure 5:
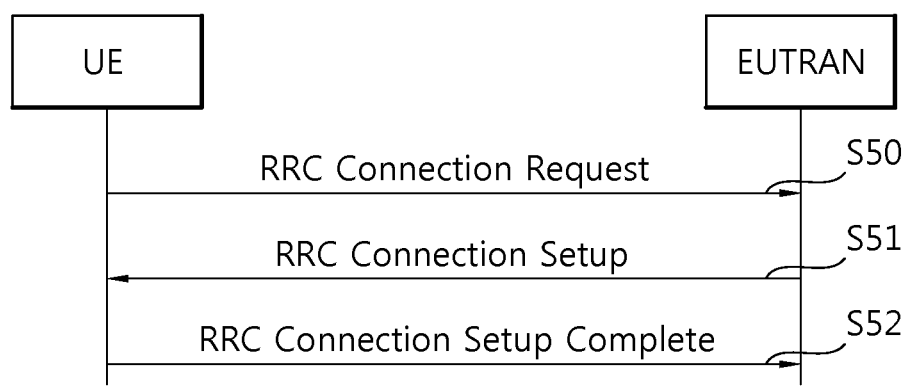
FIG. 5 shows an RRC connection establishment procedure.

FIG. 5 shows an RRC connection establishment procedure. It may be referred to Section 5.3.3 of 3GPP TS 36.331 V10.5.0 (2012-03).

The purpose of this procedure is to establish an RRC connection. The RRC connection establishment may involve SRB1 establishment. The RRC connection establishment procedure is also used to transfer the initial NAS dedicated information/message from the UE to the E-UTRAN.

E-UTRAN may apply the RRC connection establishment procedure to establish SRB1 only.

Referring to FIG. 5, at step S50, the UE transmits an RRC connection request (RRCConnectionRequest) message to the E-UTRAN. At step S51, the E-UTRAN transmits an RRC connection setup (RRCConnectionSetup) message to the UE. At step S52, the UE transmits an RRC connection setup complete (RRCConnectionSetupComplete) message to the E-UTRAN.

Figure 6:
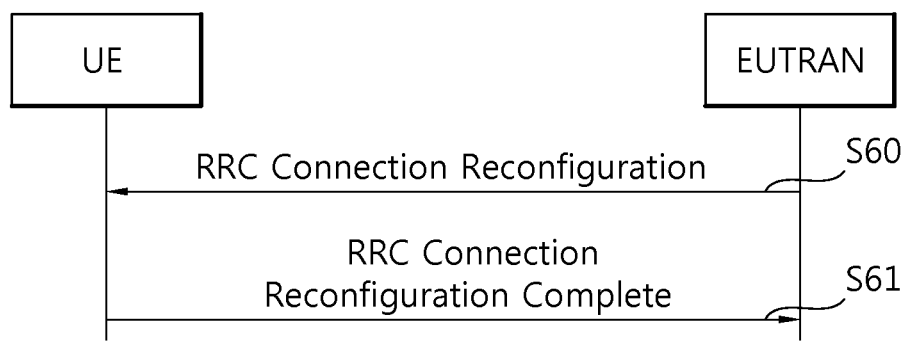
FIG. 6 shows an RRC connection reconfiguration procedure.

FIG. 6 shows an RRC connection reconfiguration procedure. It may be referred to Section 5.3.5 of 3GPP TS 36.331 V10.5.0 (2012-03).

The purpose of this procedure is to modify an RRC connection, e.g. to establish/modify/release RBs, to perform handover, to setup/modify/release measurements, to add/modify/release secondary cells (SCells). As part of the RRC connection reconfiguration procedure, NAS dedicated information may be transferred from the E-UTRAN to the UE.

Referring to FIG. 6, at step S60, the E-UTRAN transmits an RRC connection reconfiguration (RRCConnectionReconfiguration) message to the UE. At step S61, the UE transmits an RRC connection reconfiguration complete (RRCConnectionReconfigurationComplete) message to the E-UTRAN.

Figure 7:
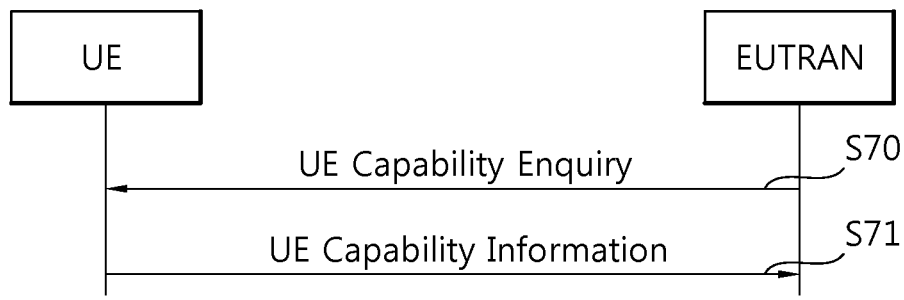
FIG. 7 shows a UE capability transfer procedure.

FIG. 7 shows a UE capability transfer procedure. It may be referred to Section 5.6.3 of 3GPP TS 36.331 V10.5.0 (2012-03).

The purpose of this procedure is to transfer UE radio access capability information from the UE to the E-UTRAN. If the UE has changed its E-UTRAN radio access capabilities, the UE shall request higher layers to initiate the necessary NAS procedures that would result in the update of UE radio access capabilities using a new RRC connection.

Referring to FIG. 7, at step S70, the E-UTRAN transmits a UE capability enquiry (UECapabilityEnquiry) message to the UE. At step S71, the UE transmits a UE capability information (UECapabilityInformation) message to the E-UTRAN.

Figure 8:
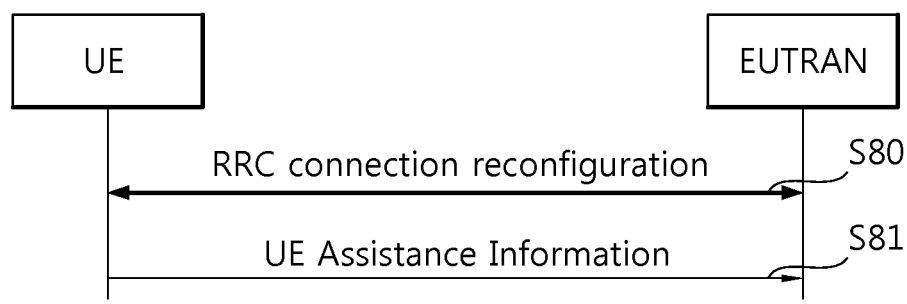
FIG. 8 shows a UE assistance information procedure.

FIG. 8 shows a UE assistance information procedure.

The purpose of this procedure is to inform the E-UTRAN of the UE's power saving preference. The E-UTRAN may consider that the UE does not prefer a configuration primarily optimized for power saving initially when it configures the UE for power preference indication. The UE assistance information may be referred to as an enhancements for diverse data applications (eDDA) indication.

Referring to FIG. 8, at step S80, the UE and the E-UTRAN performs an RRC connection reconfiguration procedure. At step S81, the UE transmits a UE assistance information (UEAssistanceInformation) message to the E-UTRAN.

A cell reselection evaluation process is described below. It may refer to 3GPP TS 36.304 V10.5.0 (2012-03).

A reselection priorities handling is described first. Absolute priorities of different E-UTRAN frequencies or inter-RAT frequencies may be provided to the UE in the system information, in the RRCConnectionRelease message, or by inheriting from another RAT at inter-RAT cell (re)selection. In the case of system information, an E-UTRAN frequency or inter-RAT frequency may be listed without providing a priority (i.e. the field cellReselectionPriority is absent for that frequency). If priorities are provided in dedicated signaling, the UE shall ignore all the priorities provided in system information. If UE is in "camped on any cell" state, the UE shall only apply the priorities provided by the system information from current cell, and the UE preserves priorities provided by dedicated signaling unless specified otherwise. When the UE in "camped normally" state, has only dedicated priorities other than for the current frequency, the UE shall consider the current frequency to be the lowest priority frequency (i.e. lower than the eight network configured values). While the UE is camped on a suitable closed subscriber group (CSG) cell, the UE shall always consider the current frequency to be the highest priority frequency (i.e. higher than the eight network configured values), irrespective of any other priority value allocated to this frequency. If the UE has knowledge on which frequency a multimedia broadcast multicast service (MBMS) service of interest is provided, it may consider that frequency to be the highest priority during the MBMS session. The UE shall delete priorities provided by dedicated signaling when:

the UE enters RRC_CONNECTED state; or
the optional validity time of dedicated priorities (T320) expires; or
a PLMN selection is performed on request by NAS.

The UE shall only perform cell reselection evaluation for E-UTRAN frequencies and inter-RAT frequencies that are given in the system information and for which the UE has a priority provided.

The UE shall not consider any black listed cells as candidate for cell reselection.

The UE shall inherit the priorities provided by dedicated signaling and the remaining validity time (i.e., T320 in E-UTRA, T322 in UTRA and T3230 in GERAN), if configured, at inter-RAT cell (re)selection.

Measurement rules for cell reselection are described. When evaluating Srxlev and Squal of non-serving cells for reselection purposes, the UE shall use parameters provided by the serving cell. Srxlev is a cell selection RX level value (dB), and Squal is a cell selection quality value (dB).

Following rules are used by the UE to limit needed measurements:

If the serving cell fulfils Srxlev>SIntraSearchP and Squal>SIntraSearchQ, the UE may choose not to perform intra-frequency measurements. SIntraSearchP and SIntraSearchQ are described in Table 1 below.

Otherwise, the UE shall perform intra-frequency measurements.

The UE shall apply the following rules for E-UTRAN inter-frequencies and inter-RAT frequencies which are indicated in the system information and for which the UE has priority provided:

For an E-UTRAN inter-frequency or inter-RAT frequency with a reselection priority higher than the reselection priority of the current E-UTRA frequency, the UE shall perform measurements of higher priority E-UTRAN inter-frequency or inter-RAT frequencies.

For an E-UTRAN inter-frequency with an equal or lower reselection priority than the reselection priority of the current E-UTRA frequency and for inter-RAT frequency with lower reselection priority than the reselection priority of the current E-UTRAN frequency:

If the serving cell fulfils Srxlev>SnonIntraSearchP and Squal>SnonIntraSearchQ, the UE may choose not to perform measurements of E-UTRAN inter-frequencies or inter-RAT frequency cells of equal or lower priority. SnonintraSearchP and SnonIntraSearchQ are described in Table 1 below.

Otherwise, the UE shall perform measurements of E-UTRAN inter-frequencies or inter-RAT frequency cells of equal or lower priority.

Cell reselection parameters are broadcast in the system information and are read from the serving cell. Table 1 shows cell reselection parameters.

TABLE 1

| Parameter | Description |
|---|---|
| cellReselectionPriority | This specifies the absolute priority for E-UTRAN frequeny or UTRAN frequency or group of GERAN frequencies or band class of CDMA2000 HRPD or band class of CDMA2000 1xRTT. |
| $Qoffset_{s,n}$ | This specifies the offset between the two cells. |
| $Qoffset_{frequency}$ | Frequency specific offset for equal priority E-UTRAN frequencies. |
| $Q_{hyst}$ | This specifies the hysteresis value for ranking criteria. |
| $Q_{qualmin}$ | This specifies the minimum required quality level in the cell in dB. |
| $Q_{rxlevmin}$ | This specifies the minimum required Rx level in the cell in dBm. |
| $Treselection_{RAT}$ | This specifies the cell reselection timer value. For each target E-UTRA frequency and for each RAT (other than E-UTRA) a specific value for the cell reselection timer is defined, which is applicable when evaluating reselection within E-UTRAN or towards other RAT (i.e. $Treselection_{RAT}$ for E-UTRAN is $Treselection_{EUTRA}$, for UTRAN $Treselection_{UTRA}$ for GERAN $Treselection_{GERA}$, for $Treselection_{CDMA\ HRPD}$, and for $Treselection_{CDMA\ 1xRTT}$). |
| $Thresh_{X,HighP}$ | This specifies the Srxlev threshold (in dB) used by the UE when reselecting towards a higher priority RAT/ frequency than the current serving frequency. |
| $Thresh_{X,HighQ}$ | This specifies the Squal threshold (in dB) used by the UE when reselecting towards a higher priority RAT/ frequency than the current serving frequency. |
| $Thresh_{X,lowP}$ | This specifies the Srxlev threshold (in dB) used by the UE when reselecting towards a lower priority RAT/ frequency than the current serving frequency. |
| $Thresh_{X,LowQ}$ | This specifies the Squal threshold (in dB) used by the UE when reselecting towards a lower priority RAT/ frequency than the current serving frequency. |
| $Thresh_{Serving,LowP}$ | This specifies the Srxlev threshold (in dB) used by the UE on the serving cell when reselecting towards a lower priority RAT/ frequency |
| $Thresh_{Serving,LowQ}$ | This specifies the Squal threshold (in dB) used by the UE on the serving cell when reselecting towards a lower priority RAT/ frequency |
| $S_{IntraSearchP}$ | This specifies the Srxlev threshold (in dB) for intra-frequency measurements. |
| $S_{IntraSearchQ}$ | This specifies the Squal threshold (in dB) for intra-frequency measurements. |
| $S_{nonIntraSearchP}$ | This specifies the Srxlev threshold (in dB) for E-UTRAN inter-frequency and inter-RAT measurements. |
| $S_{nonIntraSearchQ}$ | This specifies the Squal threshold (in dB) for E-UTRAN inter-frequency and inter-RAT measurements. |

A mobility sates of a user equipment is described.

Besides a normal-mobility state, a high-mobility and a medium-mobility state are applicable if the parameters ($T_{CRmax}$, $N_{CR\_H}$, $N_{CR\_M}$ and $T_{CRmaxHyst}$) are sent in the system information broadcast of the serving cell. The medium-mobility state is detected if the criteria for the medium-mobility state "the number of cell reselections during time period $T_{CRmax}$ exceeds $N_{CR\_M}$ and not exceeds $N_{CR\_H}$" is satisfied. The high-mobility state is detected if the criteria for high-mobility state "the number of cell reselections during time period $T_{CRmax}$ exceeds $N_{CR\_H}$" is satisfied.

The UE shall not count consecutive reselections between same two cells into mobility state detection criteria if same cell is reselected just after one other reselection.

If, the criteria for the high-mobility state is detected, the UE shall enter the high-mobility state. Else, if the criteria for the medium-mobility state is detected, the UE shall enter the medium-mobility state. Else, if the criteria for either the medium- or the high-mobility state is not detected during time period $T_{CRmaxHyst}$, the UE shall enter Normal-mobility state.

If the UE is in the high- or the medium-mobility state, the UE shall apply speed dependent scaling rules. If neither the medium- nor the high-mobility state is detected, no scaling is applied. If the high-mobility state is detected, the sf-High of "Speed dependent ScalingFactor for $Q_{hyst}$" is added to $Q_{hyst}$ if sent on the system information. For E-UTRAN cells, the sf-High of "Speed dependent ScalingFactor for $Treselection_{EUTRA}$" is multiplied by $Treselection_{EUTRA}$ if sent on the system information. If the medium-mobility state is detected, the sf-Medium of "Speed dependent ScalingFactor for $Q_{hyst}$ for medium mobility state" is added to $Q_{hyst}$ if sent on the system information. For E-UTRAN cells, the sf-Medium of "Speed dependent ScalingFactor for $Treselection_{EUTRA}$" is multiplied $Treselection_{EUTRA}$ if sent on the system information.

Table 2 shows speed dependent reselection parameters described above. The mobility state of the UE may be estimated based on the speed dependant reselection parameters, and the speed dependent scaling rules may be applied based on the mobility state of the UE.

TABLE 2

| Parameter | Description |
| --- | --- |
| $T_{CRmax}$ | This specifies the duration for evaluating allowed amount of cell reselection(s). |
| $N_{CR\_M}$ | This specifies the maximum number of cell reselections to enter Medium-mobility state. |
| $N_{CR\_H}$ | This specifies the maximum number of cell reselections to enter High-mobility state. |
| $T_{CRmaxHyst}$ | This specifies the additional time period before the UE can enter Normal-mobility state. |
| Speed dependent ScalingFactor for Qhyst | This specifies scaling factor for Qhyst in sf-High for High-mobility state and sf-Medium for Medium-mobility state. |
| Speed dependent ScalingFactor for $Treselection_{EUTRA}$ | This specifies scaling factor for $Treselection_{EUTRA}$ in sf-High for High-mobility state and sf-Medium for Medium-mobility state. |

3GPP LTE may introduce possibility for a UE to provide mobility assistance information (MAI) to a network during transition from RRC_IDLE to RRC_CONNECTED. Two different kinds of options may be proposed for mobility assistance information.

1) Mobility state estimation (MSE): The definition of the UE derived mobility state estimation (MSE) is based on the cell changes within a given time period ($T_{CRmax}$) as describe above. The mobility state of the UE may be normal-, medium- or high mobility state as describe above. The UE may provide its mobility state estimation during transition from RRC_IDLE to RRC_CONNECTED.

2) History information: The history information may be reported during transition from RRC_IDLE to RRC_CONNECTED in terms of cell IDs and time stayed in the cell(s) (either in RRC_CONNECTED or RRC_IDLE) preceding the connection set up. However, in order to define a practical solution, the amount of the history information used for the mobility assistance information may be limited. The limitation may be done primarily by limiting the number of cells to be reported. For example, if the number of cells is limited to one, i.e. to the current serving cell meaning the one where the connection is set up, the reported history information may be reduced to the time how long the UE has been in the cell. In this case, the history information used for the mobility assistance information may be further limited by having a (possibly cell specific) threshold for the time the UE has been in the cell. If the time is below a certain threshold, the UE may be considered as high mobility UE.

In addition, the number of state transitions within the cell may be reported, which would indicate the relative mobility with regard to the data activity. If there are multiple state transitions in one cell, the network may interpret that the mobility signaling is not dominating but most of the signaling is due to connection setup and release. This reported information may be an indication if the state transitions exceed a give threshold resulting in information limited to one bit.

Legacy eNBs may not support mobility assistance information and/or an eDDA indication, which are transmitted by a UE to an eNB during transition from RRC_IDLE to RRC_CONNECTED. Accordingly, UE signaling of mobility assistance information needs to be controlled by the eNB in order to avoid information to be reported unnecessarily.

To solve the problem above, a method for transmitting mobility-related information according to embodiments of the present invention is described below. According to an embodiment of the present invention, during connection establishment, an eNB defines a configuration for transmission of mobility-related information, and a UE transmits the mobility-related information based on the configuration for transmission of the mobility-related information. The mobility-related information may correspond to the mobility assistance information described above. Accordingly, the eNB can control UE signaling of the mobility-related information, and the mobility-related information can be transmitted efficiently.

Figure 9:
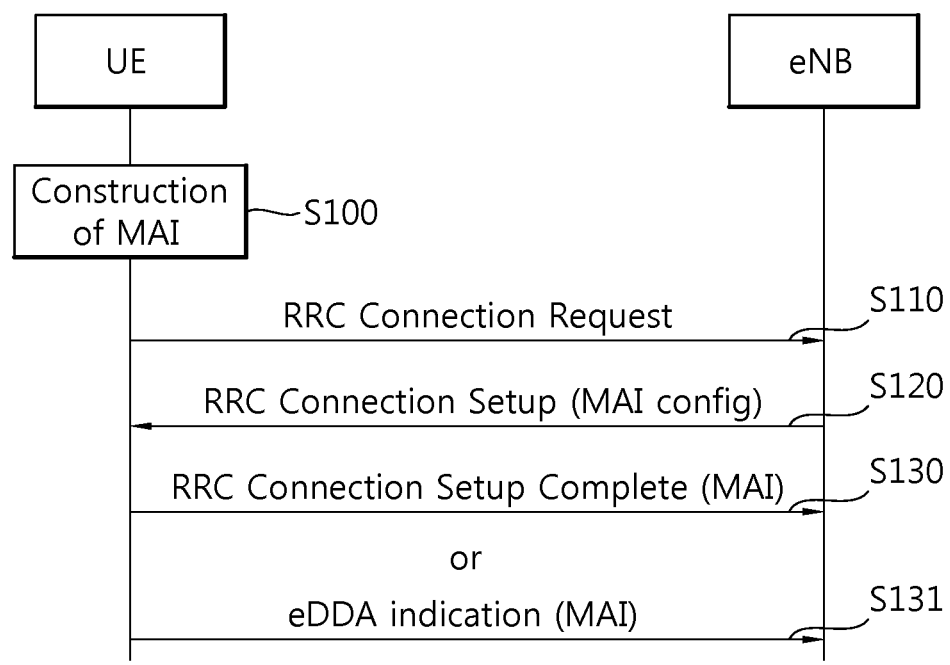
FIG. 9 shows an example of a method for transmitting mobility assistance information according to an embodiment of the present invention.

FIG. 9 shows an example of a method for transmitting mobility assistance information according to an embodiment of the present invention.

At step S100, while a UE is in RRC_IDLE, the UE constructs mobility assistance information. The mobility assistance information may include mobility state estimation or history information. The UE may construct the mobility assistance information by using knowledge acquired from one or more cells where the UE has stayed from a certain time in the past to the current time.

The UE camps on a cell. Upon request from a NAS layer of the UE, at step S110, an RRC layer of the UE transmits an RRC connection request message to an eNB.

Upon reception of the RRC connection request message from the UE, at step S120, the eNB transmits an RRC connection setup message including a MAI configuration to the UE. The MAI configuration may be a configuration for transmission of mobility assistance information.

Upon receiving the RRC connection setup message from the eNB, the UE transmits an RRC connection setup complete message to the eNB. If the MAI configuration is included in the RRC connection setup message, at step S130, the UE transmits the mobility assistance information via the RRC connection setup complete message to the eNB in the RRC connection establishment procedure. Or, at step S131, the UE may transmit the mobility assistance information via an eDDA indication to the eNB following the RRC connection establishment procedure.

Figure 10:
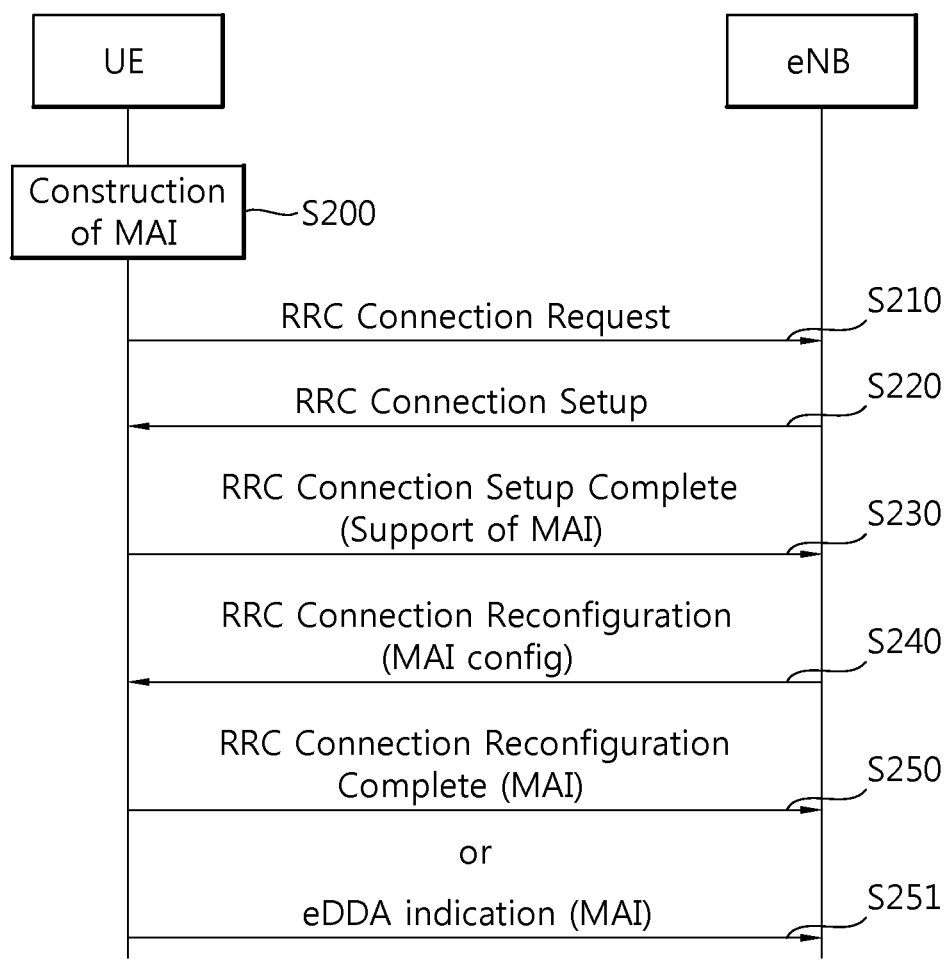
FIG. 10 shows another example of a method for transmitting mobility assistance information according to an embodiment of the present invention.

FIG. 10 shows another example of a method for transmitting mobility assistance information according to an embodiment of the present invention.

At step S200, while a UE is in RRC_IDLE, the UE constructs mobility assistance information. The mobility assistance information may include mobility state estimation or history information. The UE may construct the mobility assistance information by using knowledge acquired from one or more cells where the UE has stayed from a certain time in the past to the current time.

The UE camps on a cell. Upon request from a NAS layer of the UE, at step S210, an RRC layer of the UE transmits an RRC connection request message to an eNB. Upon reception of the RRC connection request message from the UE, at step S220, the eNB transmits an RRC connection setup message to the UE.

If the UE receives the RRC connection setup message from the eNB, at step S230, the UE transmits an RRC connection setup complete message to the eNB. If the UE supports signaling of mobility assistance information, the UE indicates support of the mobility assistance information in the RRC connection setup complete message.

At step S240, the eNB transmits an RRC connection reconfiguration message to the UE. If the support of the mobility assistance information is indicated in the RRC connection setup complete message, the eNB includes an MAI configuration in the RRC connection reconfiguration message. The MAI configuration may be a configuration for transmission of the mobility assistance information.

Upon receiving the RRC connection reconfiguration message from the eNB, the UE transmits an RRC connection reconfiguration complete message to the eNB. If the MAI configuration is included in the RRC connection reconfiguration message, at step S250, the UE transmits the mobility assistance information via the RRC connection reconfiguration complete message to the eNB in the RRC connection reconfiguration procedure. Or, at step S251, the UE may transmit the mobility assistance information via an eDDA indication to the eNB following the RRC connection reconfiguration procedure.

Figure 11:
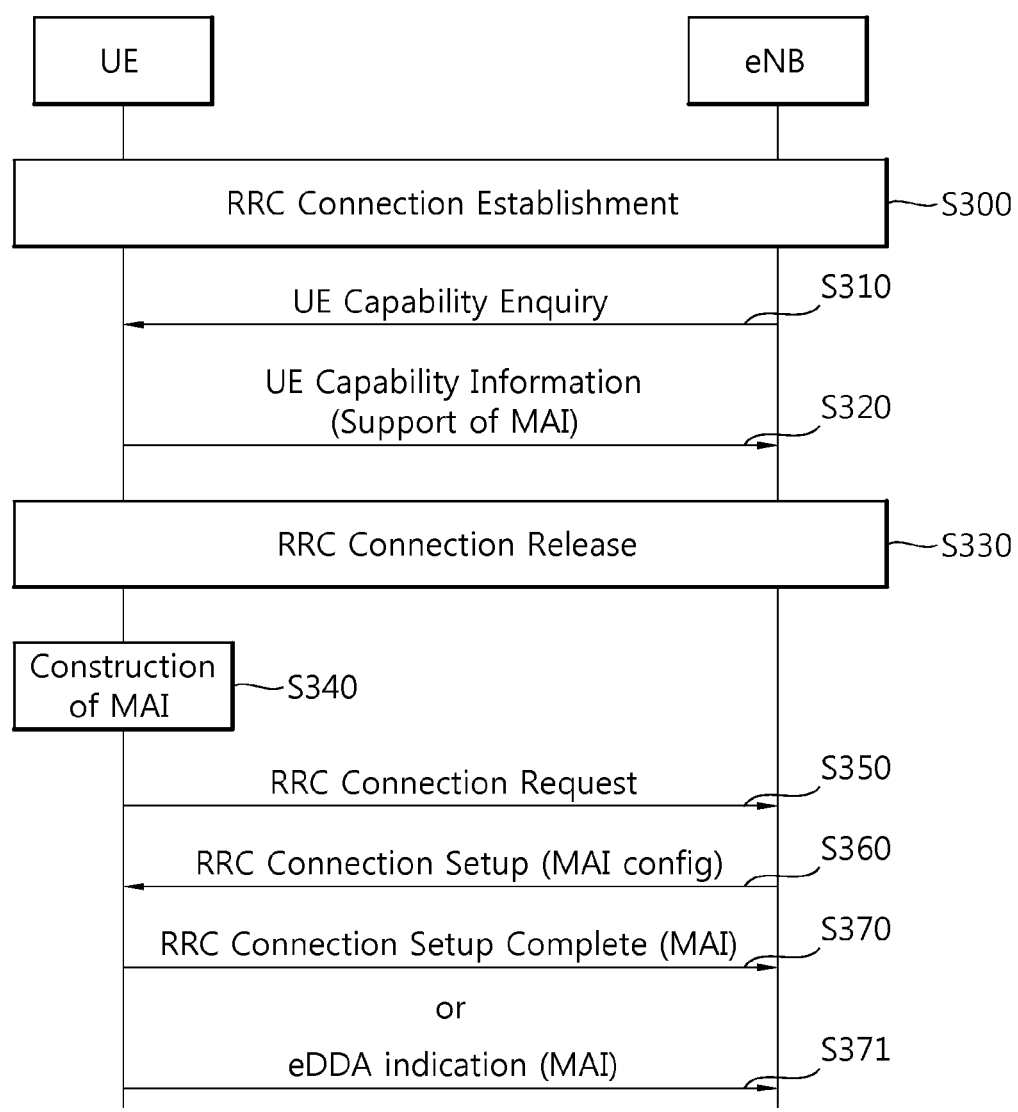
FIG. 11 shows another example of a method for transmitting mobility assistance information according to an embodiment of the present invention.

FIG. 11 shows another example of a method for transmitting mobility assistance information according to an embodiment of the present invention. FIG. 11 shows an embodiment of the present invention applied to the embodiment of the present invention shown in FIG. 9.

At step S300, a UE and an eNB perform an RRC connection establishment procedure. At step S310, while the UE is in RRC_CONNECTED, the UE may receive a UE capability enquiry message from an eNB.

In response to the UE capability enquiry, at step S320, the UE transmits a UE capability information message to the eNB. If the UE supports signaling of mobility assistance information, the UE indicates support of the mobility assistance information in the UE capability information message. Afterwards, the eNB knows that the UE supports signaling of the mobility assistance information.

At step S330, the UE may release an RRC connection and enters RRC_IDLE.

At step S340, the UE constructs the mobility assistance information. The mobility assistance information may include mobility state estimation or history information. The UE may construct the mobility assistance information by using knowledge acquired from one or more cells where the UE has stayed from a certain time in the past to the current time.

The UE camps on a cell. Upon request from a NAS layer of the UE, at step S350, an RRC layer of the UE transmits an RRC connection request message to an eNB.

Upon reception of the RRC connection request message from the UE, at step S360, the eNB transmits an RRC connection setup message to the UE. If the eNB knows that the UE supports the signaling of the mobility assistance information e.g., via the UE capability information message at step S320, the eNB includes a MAI configuration in the RRC connection setup message or in system information. The MAI configuration may be a configuration for transmission of mobility assistance information.

Upon receiving the RRC connection setup message from the eNB, the UE transmits an RRC connection setup complete message to the eNB. If the MAI configuration is included in the RRC connection setup message, and if the UE has previously indicated the support of the mobility assistance information to the eNB, at step S370, the UE transmits the mobility assistance information via the RRC connection setup complete message to the eNB. Or, at step S371, the UE may transmit the mobility assistance information via an eDDA indication to the eNB following the RRC connection establishment procedure. Or, the UE may transmit the mobility assistance information via an RRC connection reconfiguration complete message to the eNB. If the UE has not previously indicated the support of the mobility assistance information to the eNB, the UE may not transmit the mobility assistance information to the eNB until the UE indicates the support of the mobility assistance information to the eNB via the UE capability information message.

Figure 12:
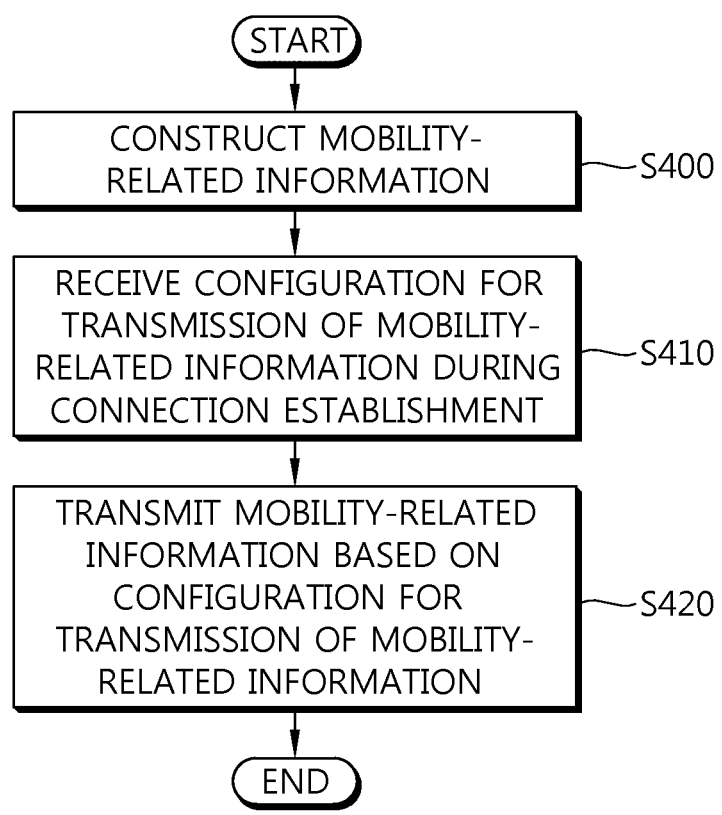
FIG. 12 shows an example of a method for transmitting mobility-related information according to an embodiment of the present invention.

FIG. 12 shows an example of a method for transmitting mobility-related information according to an embodiment of the present invention.

At step S400, a UE constructs mobility-related information. The mobility-related information may correspond to mobility assistance information. More specifically, the mobility-related information may indicate mobility state estimation or history information. The mobility state estimation may indicate one of a normal-mobility state, a medium-mobility state and a high-mobility state.

At step S410, the UE receives a configuration for transmission of the mobility-related information from an eNB during connection establishment. The configuration may be received from the eNB via an RRC connection setup message or an RRC connection reconfiguration message.

At step S420, the UE transmits the mobility-related information to the eNB based on the configuration of the transmission of the mobility-related information. The mobility-related information may be transmitted via an RRC connection setup complete message or an eDDA indication.

Further, the UE transmits the mobility-related information if the UE has previously transmitted UE capability indicating support of the mobility-related information to the eNB. Otherwise, the UE does not transmits the mobility-related information.

Figure 13:
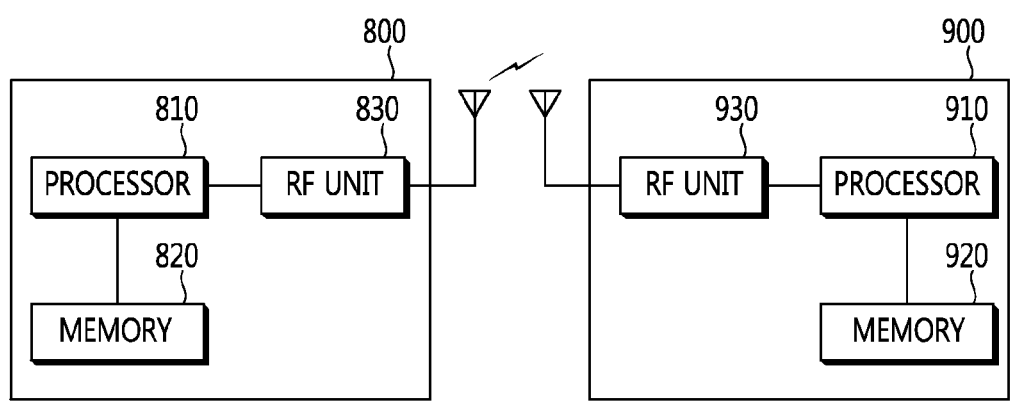
FIG. 13 is a block diagram showing wireless communication system to implement an embodiment of the present invention.

FIG. 13 is a block diagram showing wireless communication system to implement an embodiment of the present invention.

An eNB 800 may include a processor 810, a memory 820 and a radio frequency (RF) unit 830. The processor 810 may be configured to implement proposed functions, procedures and/or methods described in this description. Layers of the radio interface protocol may be implemented in the processor 810. The memory 820 is operatively coupled with the processor 810 and stores a variety of information to operate the processor 810. The RF unit 830 is operatively coupled with the processor 810, and transmits and/or receives a radio signal.

A UE 900 may include a processor 910, a memory 920 and a RF unit 930. The processor 910 may be configured to implement proposed functions, procedures and/or methods described in this description. Layers of the radio interface protocol may be implemented in the processor 910. The memory 920 is operatively coupled with the processor 910 and stores a variety of information to operate the processor 910. The RF unit 930 is operatively coupled with the processor 910, and transmits and/or receives a radio signal.

The processors 810, 910 may include application-specific integrated circuit (ASIC), other chipset, logic circuit and/or data processing device. The memories 820, 920 may include read-only memory (ROM), random access memory (RAM), flash memory, memory card, storage medium and/or other storage device. The RF units 830, 930 may include baseband circuitry to process radio frequency signals. When the embodiments are implemented in software, the techniques described herein can be implemented with modules (e.g., procedures, functions, and so on) that perform the functions described herein. The modules can be stored in memories 820, 920 and executed by processors 810, 910. The memories 820, 920 can be implemented within the processors 810, 910 or external to the processors 810, 910 in which case those can be communicatively coupled to the processors 810, 910 via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

What is claimed is:

1. A method for transmitting, by a user equipment (UE), mobility-related information in a wireless communication system, the method comprising:
   transmitting, via a UE capability information message, an indication indicating whether the UE supports a transmission of mobility-related information to a network,
   constructing the mobility-related information;
   receiving a configuration for the transmission of the mobility-related information from a network via a radio resource control (RRC) connection setup message or an RRC connection reconfiguration message during connection establishment,
   wherein the configuration is received by the UE only if the transmitted indication indicates that the UE supports the transmission of the mobility-related information; and
   based on the received configuration for transmission, transmitting the mobility-related information to the network via an enhancements for diverse data applications (eDDA) indication,
   wherein the mobility-related information is transmitted only if the configuration is included within the RRC connection setup message or the RRC connection reconfiguration message, and if the transmitted indication indicates that the UE supports the transmission of the mobility-related information.

2. The method of claim 1, wherein the mobility-related information corresponds to mobility assistance information.

3. The method of claim 1, wherein the mobility-related information indicates mobility state estimation or history information.

4. The method of claim 3, wherein the mobility state estimation indicates one of a normal-mobility state, a medium-mobility state and a high-mobility state.

5. A user equipment (UE) in a wireless communication system, the UE comprising:
   a radio frequency (RF) unit for transmitting or receiving a radio signal; and
   a processor coupled to the RF unit, and configure to:
     transmit, via a UE capability information message, an indication indicating whether the UE supports a transmission of mobility-related information to a network;
     construct the mobility-related information;
     receive a configuration for the transmission of the mobility-related information from a network via a radio resource control (RRC) connection setup message or an RRC connection reconfiguration message during connection establishment,
     wherein the configuration is received by the UE only if the transmitted indication indicates that the UE supports the transmission of the mobility-related information; and
     based on the received configuration for transmission, transmit the mobility-related information to the network via an enhancements for diverse data applications (eDDA) indication,
     wherein the mobility-related information is transmitted only if the configuration is included within the RRC connection setup message or the RRC connection reconfiguration message, and if the transmitted indication indicates that the UE supports the transmission of the mobility-related information.

6. The UE of claim 5, wherein the mobility-related information corresponds to mobility assistance information.

7. The UE of claim 5, wherein the mobility-related information indicates mobility state estimation or history information.

8. The UE of claim 7, wherein the mobility state estimation indicates one of a normal-mobility state, a medium-mobility state and a high-mobility state.

* * * * *